June 1, 1954 H. B. BREHM ET AL 2,680,162

AUTOMATIC LINE TESTING AND SWITCHING CIRCUIT

Filed Feb. 6, 1953

6 Sheets-Sheet 1

INVENTORS H. B. BREHM
J. P. KINZER
A. A. SMITH
I. G. WILSON

BY Earl C. Laughlin

ATTORNEY

INVENTORS H. B. BREHM
J. P. KINZER
A. A. SMITH
I. G. WILSON

BY Earl C. Laughlin
ATTORNEY

June 1, 1954 H. B. BREHM ET AL 2,680,162

AUTOMATIC LINE TESTING AND SWITCHING CIRCUIT

Filed Feb. 6, 1953 6 Sheets-Sheet 3

INVENTORS H. B. BREHN J. P. KINZER A. A. SMITH I. G. WILSON

BY Earl C. Laughlin

ATTORNEY

INVENTORS H. B. BREHM
J. P. KINZER
A. A. SMITH
I. G. WILSON

BY Earl C. Laughlin
ATTORNEY

INVENTORS H B BREHM
J P KINZER
A A SMITH
I. G. WILSON
BY Earl C. Laughlin
ATTORNEY INVENTORS H. B. BREHM
J. P. KINZER
A. A. SMITH
I. G. WILSON
BY Earl C. Laughlin
ATTORNEY Patented June 1, 1954

2,680,162

UNITED STATES PATENT OFFICE 2,680,162

AUTOMATIC LINE TESTING AND SWITCHING CIRCUIT

Harold B. Brehm and John P. Kinzer, New Providence, and Aubrey A. Smith, Fanwood, N. J., and Ira G. Wilson, New York, N. Y., assignors to Bell Telephone Laboratories, Incorporated, New York, N. Y., a corporation of New York Application February 6, 1953, Serial No. 335,514

9 Claims. (Cl. 179—175.3)

Figure 1:
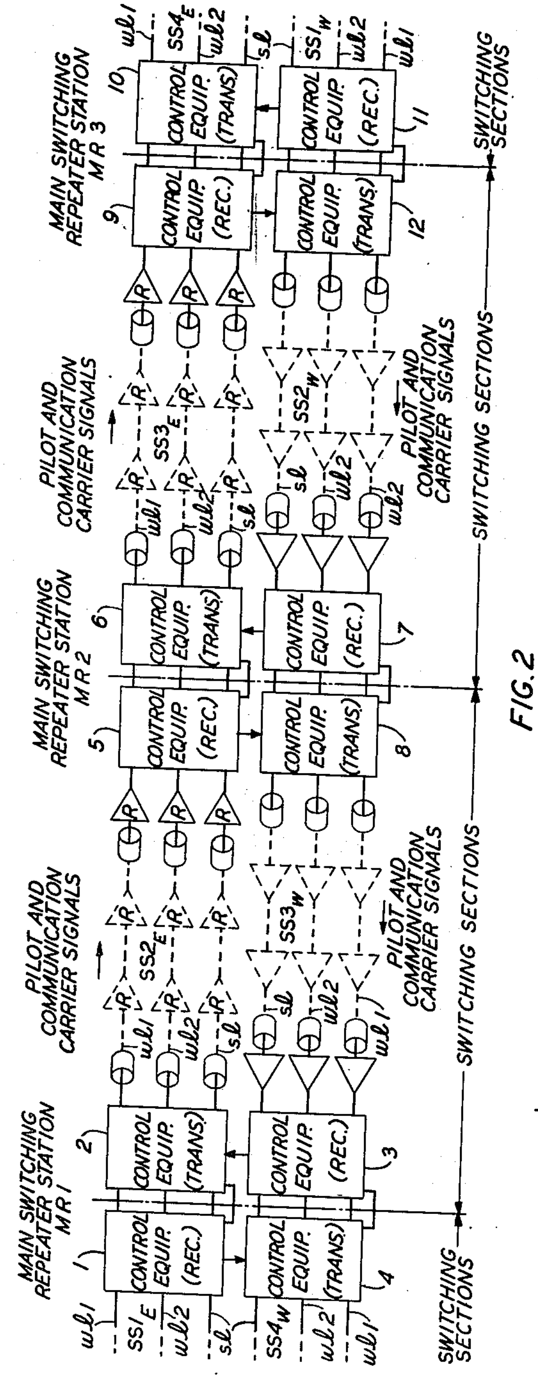

The invention relates to broad frequency band transmission systems, such as multichannel carrier wave communication systems, and particularly to line testing and switching circuits for use with such systems.

In such systems employed for transmitting signal waves over a long distance it is customary to use a large number of repeaters in tandem at suitably-spaced points, some of which may be attended and others unattended. The failure or substantial impairment in transmission efficiency of a single transmission element, for example, an amplifying vacuum tube in a repeater, or a line conductor in a line section between repeaters, may result in intolerable degradation of signal transmission over the system. In certain carrier wave systems in which a single line pair or coaxial conductor is employed for transmitting several hundred message channels, such complete or partial failure of certain transmission elements in the common transmission path may interrupt or seriously impair transmission in a large number of message circuits. For that reason, it is known to employ in such systems, for each direction of transmission, two or more completely equipped paralleled lines in each switching section between attended repeater stations, one of which is used as the regular line and the others as reserve or spare lines. In such systems, the transmitting ends of all of these lines are usually permanently tied to the working line of the preceding repeater section, but the receiving end of only the working line is normally connected to the working line of the following switching section, and switching equipment controlled from the working line in each switching section is automatically responsive to a serious faulty condition of that line to effectively disconnect its receiving end from the connecting working line of the following switching section and to connect thereto the receiving end of one of the other lines in the same section, so as to substitute the latter line in the through signal transmission path as a spare for the faulty line.

It is also known in the prior art, to employ a number of pilot waves of different frequencies outside the signal frequency range continuously transmitted over the transmission lines in such a carrier system for monitoring the lines in each repeater switching section and, when the condition of a monitored pilot at the output of the working line indicates a serious faulty condition of that line, to cause its receiving end to be disconnected from the associated working line in the following repeater section and the receiving end of another (spare) line which the monitoring test has indicated is in tolerable working condition to be connected thereto, thus inserting the spare line in the through signal transmission path in place of the faulty line.

Objects of the invention are to improve automatic line switching arrangements of the above-described general type particularly from the standpoint of effectiveness in operation; economy in maintenance and operation of the system for a given amount of switching; to make at least one line in each cable section serve as a spare or reserve line for a number of other lines therein thus making available a larger number of lines in each cable for "working" lines; and to increase the speed of switching with little increase in switching circuit cost or complexity.

The automatic line switching arrangements in accordance with the invention for attaining these objects requires the use in each switching section of such a carrier system, of only one line for each direction of transmission as a spare or reserve line for a number of other "working" lines transmitting in the same direction, a number of pilot signals of different frequencies outside the signal frequency range, normally used for repeater gain regulation, indication or other control purposes, being continuously transmitted over each of the lines in each switching section. This system may be a coaxial system of from four to eight transmission lines with an equal number of lines transmitting in the two directions of transmission or with an unbalanced directional line distribution, for example, a 5-to-3 line arrangement. For the purposes of this invention, this carrier system for each direction of transmission is divided into a plurality of switching sections in tandem each connected between two attended repeater stations, which will be referred to hereinafter as main switching repeater stations, each switching section consisting of like sections of the spare and working lines for that direction of transmission, connected in parallel relation with each other between these stations and each of these line sections including the same number of similarly-spaced intermediate non-attended repeaters.

Testing and switching equipment in accordance with the invention is located at each main switching repeater station and at the terminal stations. The equipment at each main switching repeater station includes a plurality of pilot indicators bridged across the output of each of the parallel-connected lines, in the preceding switching section, which are respectively adapted for picking off from the associated line and monitoring the energy in a different one of a number of the pilot signals received over that line. An abnormal change in the power level of any one of the monitored pilot signals indicating a serious faulty condition of the associated line in the same switching section, controls the switching of a spare line into the through signal transmission path in place of the faulty line.

Since only one spare line is provided for several working lines in each switching section, and, in the general case, both ends of a faulty line and the spare therefor are to be switched, separate switches for this purpose are required at the transmitting and receiving ends of each switching section, and the receiving end switch must be delayed after a pilot indicator at the receiving end of the switching section indicates by its condition that a switch to a spare line should be made until information can be sent back to the transmitting end to make a switch thereat. The operation and synchronization of the line switching equipment at the transmitting and receiving ends of each switching section for this purpose is accomplished by the provision of means at each main switching repeater station under control of any one of the pilot indicators associated with the receiving end of a faulty line in the preceding switching section for sending back a switching tone of a distinctive frequency identifying the faulty line, which is different for each line in the switching section, over the signal transmission lines (coaxials) transmitting in the opposite direction to the main switching repeater station at the transmitting end of the switching section to properly control the transmitting switching equipment thereat, means being provided for confining the switching signal to the line section in which a fault has occurred. The proper operation of the line switching equipment at the receiving end of the faulty line is then made under control of a verifier tone sent out over the spare line from the transmitting end when the switching equipment thereat is operated. The switching equipments are arranged to return the system to the normal condition in which the spare line is disconnected at its transmitting and receiving ends from the working lines of the preceding and following switching sections, respectively, and the normal working line is reconnected at both its ends to the working lines of these switching sections, respectively, when the faulty condition of the normal working line has been corrected.

The switching equipment at the terminal stations of such a signal transmission system differs from that used at each main switching repeater station only in that the pilot indicators and the receiving switch equipment associated with the lines transmitting in one direction and the transmitting switching equipment and the verifier tone generating equipment associated with the lines transmitting in the opposite direction, used in the latter station, are eliminated.

A feature of the invention is the use of a relatively simple and inexpensive control circuit, which is essentially electronic, in a line switching arrangement of the above-described type for providing relatively fast line testing and switching as compared to that employed with the best of the prior art switching circuits for this purpose.

Another feature is the provision in a line switching arrangement of the above-described type, of means for giving priority as regards switching to a spare line, to one working line over the others in each switching section; and for establishing lesser, different priorities for the other working lines in the same switching section.

Figure 2:
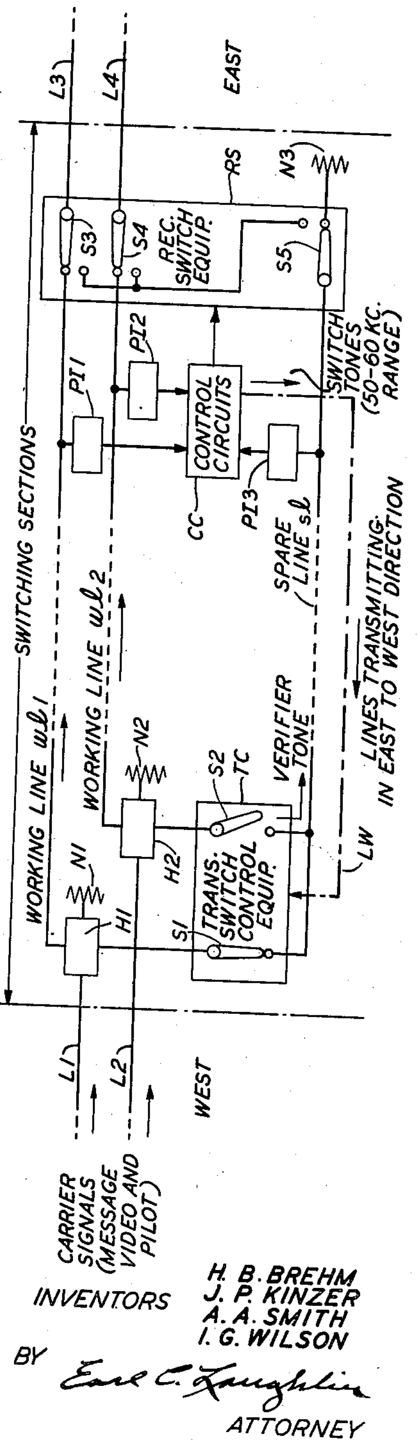
Figure 5:
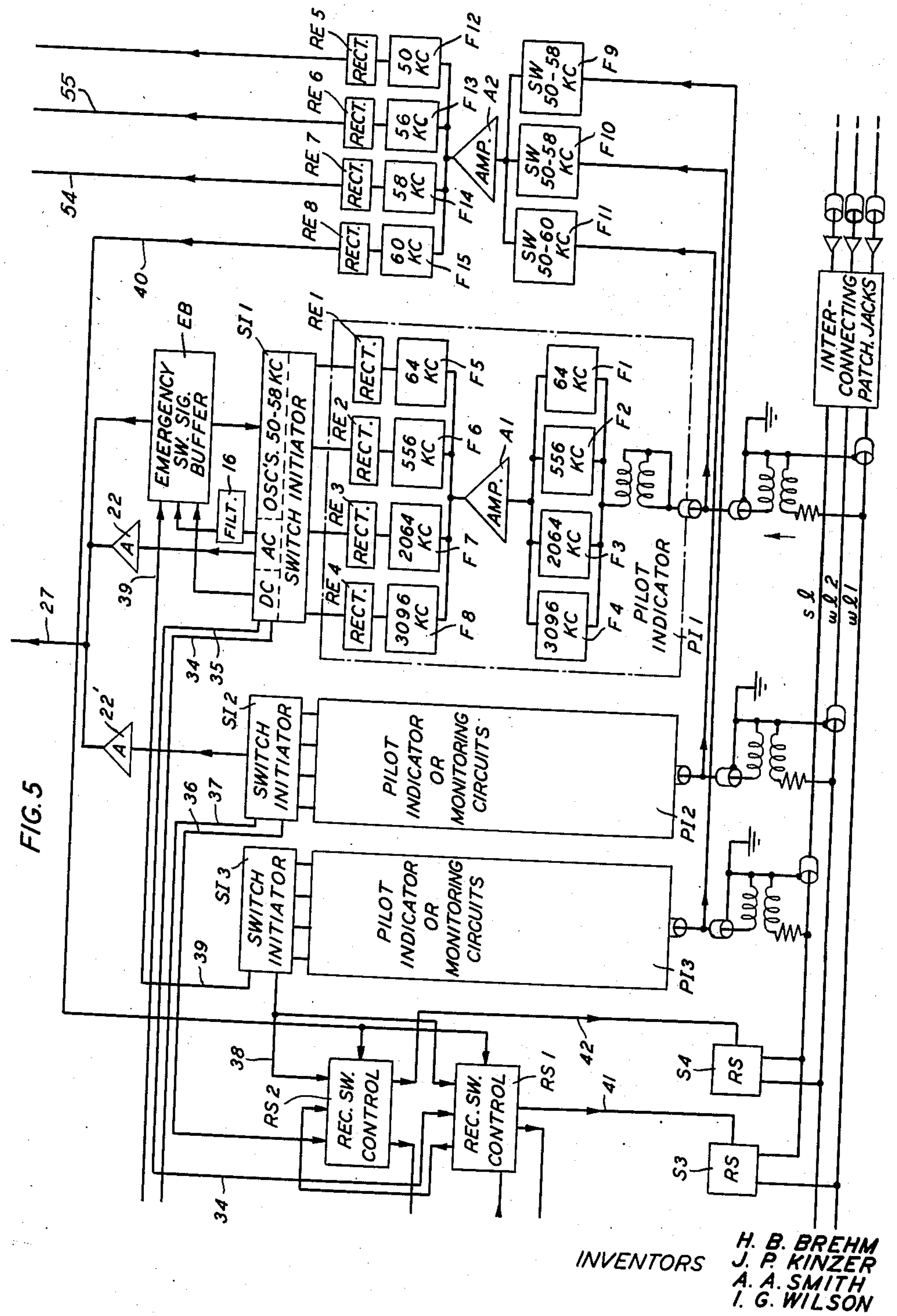
Figure 6:
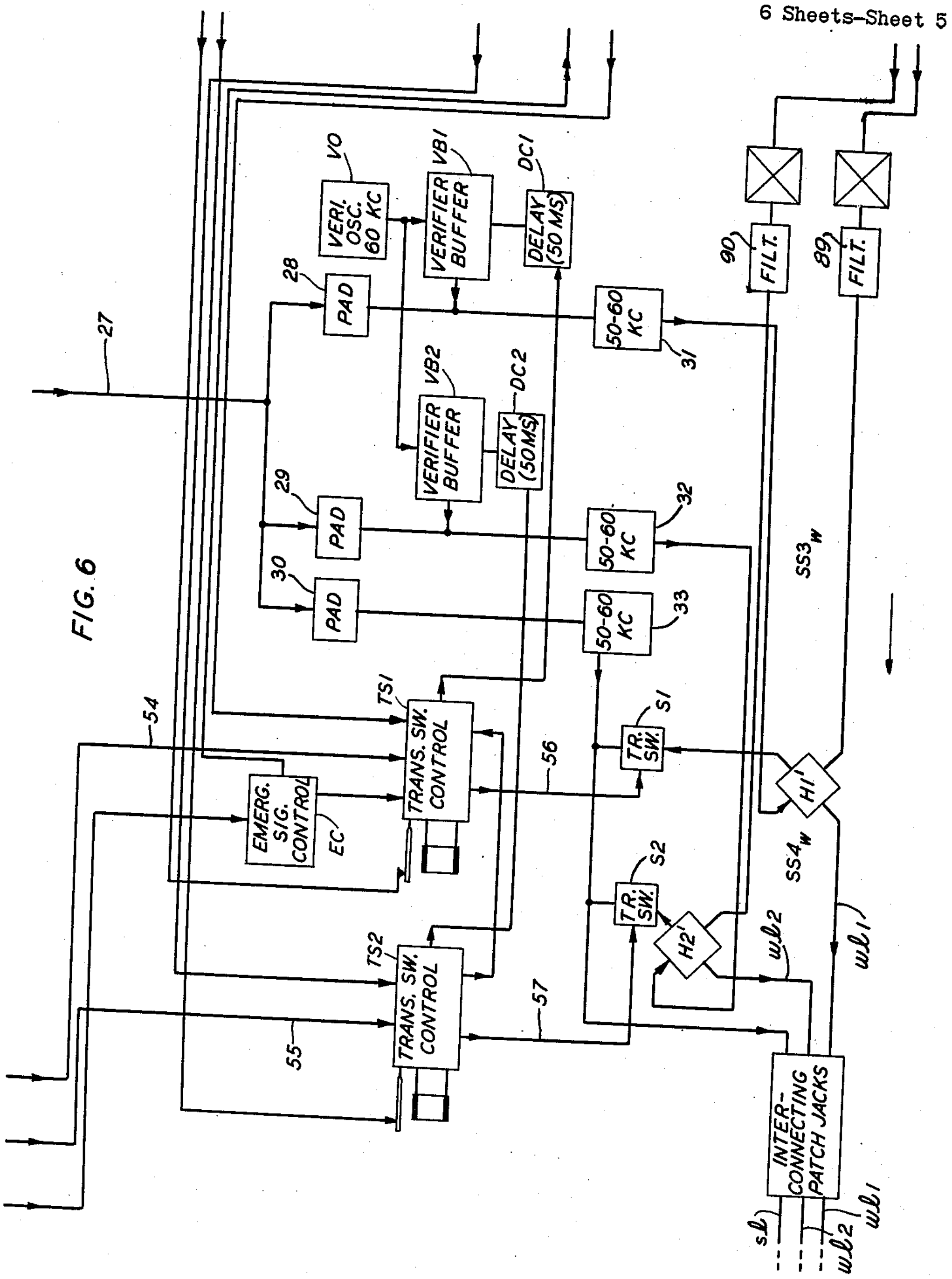
Figure 8:
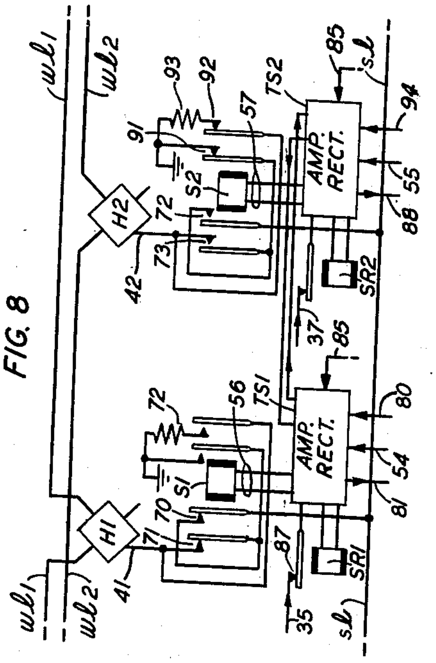
Figure 9:
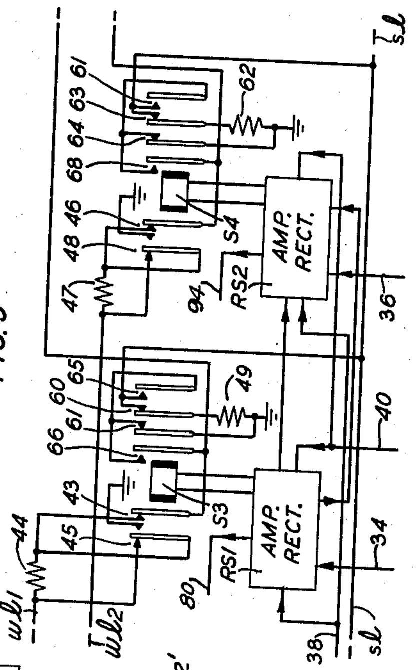
Figure 7:
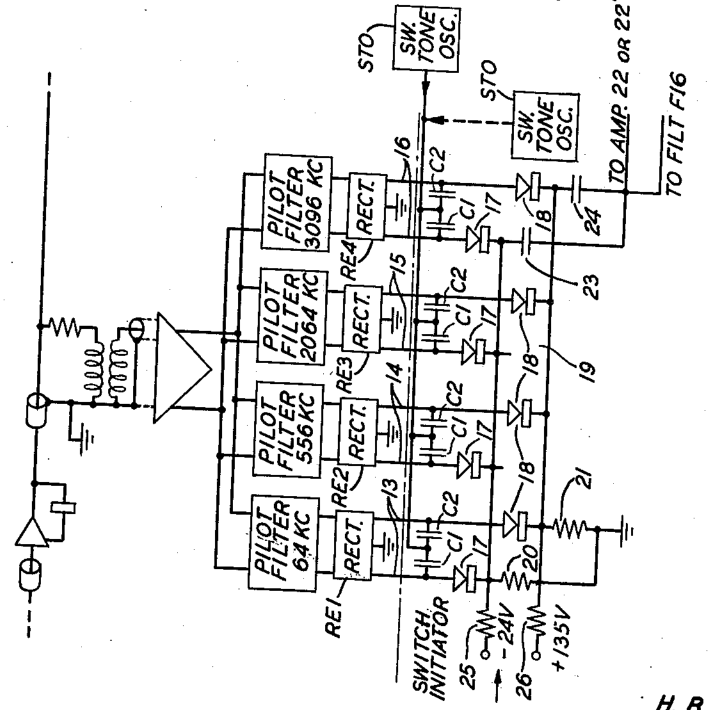

The various objects and features of the invention will be better understood from the following detailed description of one embodiment thereof when read in conjunction with the accompanying drawings in which:

Fig. 1 shows diagrammatically a portion of a two-way broad-band carrier communication system equipped with line testing and switching equipment in accordance with the invention;

Fig. 2 shows a simplified schematic of a portion of the carrier communication system of Fig. 1 in which the testing and switching equipments in accordance with the invention associated with one of the corresponding switching sections for the two directions of transmission of the system of Fig. 1 are shown in more detail, which schematic is used in connection with a brief description of the essential principles of the invention;

Figs. 3 to 6, in combination, show in block schematic form the testing and switching equipments in accordance with the invention which would be used at each of the main switching repeater stations in the system of Fig. 1;

Fig. 7 shows in more detail a portion of a pilot pick-off circuit (pilot indicator) and one form of switch initiator circuit which may be used in the blocks so labeled in the receiving control equipment at each main switching repeater station as shown in Figs. 3 to 6; and Figs. 8 and 9 respectively show schematically forms of transmitting and receiving switching equipment which may be used in the boxes so labeled in each main switching repeater station in accordance with the invention shown in Figs. 3 to 6.

Although the arrangements of the invention are adapted for use with any broad-band signal transmission system employing any type of line, it is particularly adapted for and will be described in connection with a two-way multichannel carrier system employing a type of line structure comprising a tubular conductor within which a central conductor or wire is mounted coaxially by means of insulating supports, commonly referred to as a "coaxial" or a "coaxial pair," and in which a number of these coaxial pairs respectively serving as regular (working) and reserve (spare) lines are contained within a common outer tubular conductor to form what is known as a coaxial cable or "pipe."

The particular coaxial system to be described for which the line testing and switching arrangements of the invention were devised, operates on a four-wire basis, transmission in opposite directions being effected on separate coaxials. This system will provide on one pair of coaxials alternatively, either 1800 two-way telephone circuits; 600 telephone circuits plus a high-grade, two-way, 4-megacycle television circuit; or, by using the entire frequency band, a single two-way 7-megacycle television circuit suitable for wide-band color or theater television. This system provides for the transmission of the message and television services at line frequencies between 312 and 8,284 kilocycles over a distance up to 4,000 miles. The repeaters in the system are located at nominal intervals of about 4 miles, and the length of each switching section extending between two main switching repeater stations is about 300 miles or less. Pilot waves of the different frequencies 64, 556, 2,064, 3,096, 7,266 and 8,320 kilocycles are continuously transmitted over this system between terminal stations in each direction of transmission, normally for use for regulating the gain and loss characteristics of the repeaters and equalizers located at certain repeater points.

In Fig. 1, four successive repeater sections $SS1_E$, $SS2_E$, $SS3_E$ and $SS4_E$, and $SS1_W$, $SS2_W$, $SS3_W$ and $SS4_W$, respectively, of such a carrier system are illustrated for each direction of transmission. The main switching repeater station MR1 connects the west-to-east switching sections $SS1_E$ and $SS2_E$ and the east-to-west switching sections $SS3_W$ and $SS4_W$; the main switching repeater station MR2 connects the west-to-east switching sections $SS2_E$ and $SS3_E$ and the east-to-west switching sections $SS2_W$ and $SS3_W$; and the main switching station MR3 connects the west-to-east switching sections $SS3_E$ and $SS4_E$ and the east-to-west switching sections $SS1_W$ and $SS2_W$. Each of the west-to-east switching sections $SS1_E$ . . . $SS4_E$ and each of the east-to-west switching sections $SS1_W$ . . . $SS4_W$ includes three paralleled sections of lines, two of which, *wl1* and *wl2*, are regular or working lines and the third of which *sl*, is a reserve or spare line for each of the other two lines. The lines *wl1*, *wl2* and *sl* in each switching section includes a like number of similarly spaced unattended repeaters R and the necessary associated power supplies and regulating equipment (not shown) therefor. Of the pilot waves normally transmitted over the system, those of the frequencies 64, 556, 2,064 and 3,096 kilocycles continuously transmitted over each of the lines *wl1*, *wl2* and *sl* for each direction of transmission are used for monitoring these lines in the manner to be described later.

The line testing and switching equipment in accordance with the invention at the main switching repeater station MR1 includes control equipment represented by the box 1 associated with the receiving ends of the lines in the switching section $SS1_E$; control equipment represented by the box 2 associated with the transmitting ends of the lines in switching section $SS2_E$; control equipment represented by the box 3 associated with the receiving ends of the lines in the switching section $SS3_W$; and control equipment represented by the box 4 associated with the transmitting ends of the lines in the switching section $SS4_W$, as indicated. Similarly, the line testing and switching equipment in accordance with the invention at the main switching repeater station MR2 includes control equipment represented by the box 5 associated with the receiving ends of the lines in the switching section $SS2_E$; control equipment represented by the box 6 associated with the transmitting ends of the lines in the switching section $SS3_E$; control equipment represented by the box 7 associated with the receiving ends of the lines in the switching section $SS2_W$; and control equipment represented by the box 8 associated with the transmitting ends of the lines in the switching section $SS3_W$. Similarly, the line testing and switching equipment in accordance with the invention at the main repeater station MR3 includes control equipment represented by the box 9 associated with the receiving ends of the lines in the switching section $SS3_E$; control equipment represented by the box 10 associated with the transmitting ends of the lines in the switching section $SS4_E$; control equipment represented by the box 11 associated with the receiving ends of the lines in the switching section $SS1_W$; and control equipment represented by the box 12 associated with the transmitting ends of the lines in the switching section $SS2_W$.

Fig. 2 shows in simplified schematic form the circuits for correspondingly-located switching repeater sections, say, $SS2_E$ and $SS3_W$, for opposite directions of transmission in the system of Fig. 1. The switching sections for the west-to-east direction, as indicated, may include two working lines *wl1* and *wl2* and one spare line *sl* in parallel with each other, all of these lines being adapted for transmitting in that direction as shown; and the corresponding switching section for the east-to-west direction may comprise similar lines and their associated transmitting and receiving control equipment (not shown) transmitting in the east-to-west direction, represented in the figure by the dot-dash line LW.

The input of the working line *wl1* is connected through the hybrid coil H1 to the output of a working line L1 in a preceding repeater switching section, transmitting in the direction from west-to-east carrier waves modulated with message and/or video signals and a number of pilot waves of different frequencies outside the signal frequency range, constituting one carrier channel of the system of Fig. 1. The input of the working line *wl2* is connected through the hybrid coil H2 to the output of a working line L2 in the preceding switching section, transmitting in the direction from west-to-east carrier waves modulated with message and/or video signals and a number of pilot waves of different frequencies outside the signal frequency range, constituting a second carrier channel on the system of Fig. 1. The input of the spare line *sl* is adapted to be automatically connected either to a line L1 then operating as the working line in the preceding switching section, which may be the normal working line *wl1* or the spare line *sl* in that section depending on the condition of these lines in that section, through the hybrid coil H1, in parallel with the input of the working line *wl1*, or to the line L2 operating as the second working line in the preceding switching section, through the hybrid coil H2, in parallel with the input of the working line *wl2*, under control of switching equipment represented by the switches S1 and S2 in the transmitting control equipment TC corresponding to the control equipments 2, 4, 6, 8, 10 and 12 at the main switching repeater stations MR1, MR2 and MR3, respectively, in the system of Fig. 1, in the manner to be described later. The hybrid coil H1 and the associated line balancing network N1, and the hybrid coil H2 and the associated line balancing network N2, constitute Wheatstone bridge circuits well known in the art, for enabling transmission between the lines L1 and the working line *wl1* and the spare line *sl*, or between the lines L2 and the working line *wl2* and the spare line *sl*, depending on the condition of operation of the switches S1 and S2 in the transmitting control circuit TC, while providing conjugacy between the inputs of *wl1* and *sl*, or between the inputs of *wl2* and *sl*, respectively. The outputs of the working line *wl1*, the working line *wl2* and the spare line *sl* are adapted to be automatically connected to or disconnected from the lines L3 and L4 in the following switching section, and the line terminating network N3, respectively, by means of the switching equipment represented by the switches S3, S4 and S5, respectively, in the receiving switching equipment RS corresponding to the receiving switching equipment in the control equipments 1, 3, 5, 7, 9 and 10 at the main switching repeater stations MR1, MR2 and MR3, respectively, in the system of Fig. 1.

Separate pilot indicators PI1, PI2 and PI3 are bridged across the outputs of the working lines *wl1* and *wl2* and the spare line *sl*, respectively. Each of these pilot indicators, the detailed construction of which is shown in Figs. 3 to 6, is adapted to monitor the power in each of a number of the pilot waves of different frequencies transmitted over the associated line, and to be responsive to an abnormal change in the power of any one of these pilot waves such as would be caused by a serious faulty condition of that line in some portion of the transmitted signal frequency range, to control operation of a different portion of the control circuits represented by the box CC, as is indicated by the arrow pointing from the output of each pilot indicator towards the box CC. The control circuits CC are included in the receiving control equipments 1, 3, 5, 7, 9 and 11 at the main switching repeater stations MR1, MR2 and MR3, respectively, in the system of Fig. 1. The manner of operation of the control circuits CC, the construction of which is shown in detail in Figs. 3 to 6, under control of one or more of the pilot indicators PI1, PI2 and PI3 in response to faulty conditions of the associated lines, to control the switching of the several lines will now be generally described in connection with Fig. 2, for various combinations of line failures under appropriate headings.

*Normal circuit.—Spare line available*

Under normal operating conditions with no working line faults present, the line *sl* is available as a spare to either of the working lines *wl1* and *wl2* on a priority basis. When the line *wl1* is the preferred working line as regards priority in switching to the spare line *sl* in response to a serious line fault, the switches S1 and S2 in the transmitting control circuit TC will be normally in the released condition indicated in Fig. 2, with switch S1 closed to connect the input of the line *sl* to the hybrid coil H1 and the switch S2 open to effectively disconnect the input of line *sl* from the hybrid coil H2. In that case, the pilot wave energy modulated on carrier waves, incoming over the line L1 in the preceding switching section and impressed on the hybrid coil H1 along with communication carrier signals will be divided between the inputs of the lines *wl1* and the spare line *sl* and will be transmitted over these lines to the inputs of the pilot indicators PI1 and PI3, respectively, associated with these lines, and to the receiving switching equipment RS. For this condition of the circuits, the switches S3, S4 and S5 in the receiving switching equipment RS are in the normal released position shown in Fig. 2 so that the communication and pilot carrier signals received over the line *wl1* or the line *wl2* will be transmitted to the lines L3 and L4, respectively, in the following switching section, and the portions of the communication and pilot carrier signals reaching the output of the spare line *sl* will be dissipated in the terminating network N3.

*Case I.—Failure of working line wl1 only*

When there is a serious fault in the preferred working line *wl1* and the spare line *sl* is in tolerable working condition, the resultant abnormal change of the pilot wave power in the output of the pilot indicator PI1 associated with line *wl1* at its receiving end, will cause operation of a portion of the control circuits CC in a particular manner. This type of operation will cause a switching tone of a frequency identifying that line, which is different for each working line and within a frequency range, say 50 to 60 kilocycles, below the signal frequency range, to be released by this portion of the circuits CC. This identifying tone will be impressed on the inputs of the transmission lines LW in the corresponding switching section transmitting in the direction from east-to-west, and will be transmitted over these lines to the input of the switching section where it will cause operation of the transmitting control equipment TC.

The operation of the transmitting control equipment TC under control of the tone identifying the preferred working line *wl1*, will be such that the switches S1 and S2 in the equipment will be maintained in the normal released positions shown, but a verifier tone, say, of the frequency of 60 kilocycles, will be released from the control equipment TC and transmitted over the spare line *sl* to the receiving end of the switching section. This verifier tone at the receiving end of the switching section will cause operation of the switches S3 and S5 in the receiving switching equipment RS to their alternate contacts, thereby disconnecting the output of the normal working line *wl1* from the input of the working line L3 in the following switching section and disconnecting the output of the spare line *sl* from its terminating network N3 and connecting it to the line L3 in the following switching section. Thus the spare line *sl* will be substituted for the normal working line *wl1* in the through transmission path over the switching section between the line L1 at its transmitting end and the line L3 at its receiving end. The switches S3 and S5 in the receiving control equipment RC will be maintained locked operated in their last-mentioned operated positions until the fault on the normal working line *wl1* is removed, after which the switches S3 and S5 will be returned to their normal released positions indicated in Fig. 2 to reconnect the output of the working line *wl1* to the lines L3 and to disconnect the output of the spare line *sl* therefrom and reconnect it to the terminating network N3.

*Case II.—Failure of working line wl2 only*

When the working line *wl1* and the spare line *sl* are in tolerable working condition and a serious fault develops in the working line *wl2*, the resultant abnormal change in the pilot wave power in the output of the pilot indicator PI2 associated with the latter line will cause operation of another portion of the control circuits CC in a different manner. The operated portion of the control circuits CC in this case will cause the release of a switching tone of a frequency different from that identifying the working line *wl1* but within the frequency range 50 to 60 kilocycles, identifying the line *wl2*, which tone will be impressed on the inputs of the lines LW in the corresponding switching section transmitting in the direction from east to west, and will be transmitted over the latter lines to the input of the switching section. At the input of the switching section, the later tone will cause operation of the transmitting control equipment TC in the following manner. The switch S1 will be opened to disconnect the input of the spare line *sl* from the hybrid coil H1 and the switch S2 will be simultaneously closed to connect the input of the spare line *sl* to the hybrid coil H2, thereby disconnecting the input of the line *sl* from the ouput of the line L1 in the preceding switching section and connecting it to the output of the line L2 in the preceding switching section. The operation of the transmitting control equipment TC under control of the switching tone identifying the faulty line *wl2* received over the lines LW, will also cause a verifier tone, say, of the frequency of 60 kilocycles, to be released from that equipment and to be transmitted over the spare line *sl* to the output end of the switching section where it will be effective to cause operation of the switches S4 and S5 in switching equipment RS to their alternate contacts thereby disconnecting the output of the line *wl2* from the lines L4 in the following switching section and disconnecting the output of the spare line *sl* from its terminating network N3 and connecting it to the input of the lines L4 in the following switching section. Thus, the spare line *sl* will be substituted for the faulty working line *wl2* in the through transmission path from the lines L2 at the input of the switching section to the lines L4 at the output of the switching section. The switches S4 and S5 will be maintained in their last operated positions while the preferred working line *wl1* and the spare line *sl* remain "good," until the fault on the working line *wl2* is removed, after which these switches will be returned to their normal released positions in which the line *wl2* is reinserted in the through transmission path between the lines L2 and L4 in place of the spare line *sl*.

*Case III.—Spare line failure only*

When a serious fault develops in the spare line *sl*, the resultant abnormal change in the pilot wave power in the output of the pilot indicator PI3 will cause the operation of a third portion of the control circuits CC in a different manner. The operated portion of the control circuits CC in this case will cause the release of all switches S3, S4 and S5 in the receiving switch equipment RS to the normal condition indicated, if they are not previously in that condition, and will maintain these switches so released for the duration of the spare line fault. In this case, the spare line *sl* will be terminated in the terminating network N3 and, therefore, will not transmit carrier signals either to the working line L3 or to the working line L4 in the following switching section during the duration of the spare line fault. The operation of other switching sections in the carrier link will not be affected.

*Case IV.—Coexistent failures on working lines wl1 and wl2.—Line wl1 fails first or simultaneously with wl2*

This case covers the condition where a fault on the working line *wl2* occurs in the same section containing a fault on the preferred working line *wl1*. The operations in response to the fault on the working line *wl1* is the same as described in Case I above, whether the fault on line *wl1* occurs before or simultaneously with the fault on the working line *wl2*, since the working line *wl1* has priority over the working line *wl2*. The working line *wl2* under this condition cannot at any time take the spare line *sl* from the working line *wl1* at the receiving end of the section. Therefore, the working line *wl2* remains faulty in this repeater section and all the following sections in the carrier link until the fault on the preferred working line *wl1* is removed. The spare line *sl* in each of the following switching sections of the link is available for the preferred working line *wl1* but not for the non-preferred working line *wl2*.

*Case V.—Co-existent failures on working lines wl1 and wl2.—wl2 fails first*

When a fault on working line *wl2* is followed by a fault on the preferred working line *wl1* in the same repeater section, the following switching operations can occur: (A) Transmission is first switched from working line *wl2* to the spare line *sl* as described in Case II; (B) a subsequent fault on the preferred working line *wl1* permits it to take the spare line *sl* from the working line *wl2* by (1) the transmitted switching tone released by failure of the line *wl1* and sent back over the east-to-west lines LW, causing the release of the switch S2 in the transmitting control equipment TC to disconnect the input of the spare line *sl* from hybrid coil H2 and closing of the switch S1 in the equipment TC to connect the input of the spare line to the hybrid coil H1; and (2) the verifier tone released by TC and sent back over the spare line *sl* to the receiving end of the section, causing the release of the switch S4 and the operation of the switches S3 and S5 in the receiving switch equipment RS to reconnect the receiving end of the line *wl2* to the line L4, to disconnect the receiving end of the line *wl1* from the line L3 and to connect the receiving end of the spare line *sl* thereto, respectively.

*Case VI.—Coexistent failures on working line wl1 and spare line sl.—Line wl1 fails first*

If the preferred working line *wl1* fails before the spare line *sl* in the same switching section, a switch will be made to the spare line *sl* as described in Case I. When the spare line *sl* subsequently fails, this will cause immediately the release and blocking of all of the receiver switches in that section. After a given time interval (15 milliseconds), the double failure will initiate an emergency switch at the transmitting end of the faulty section in the manner shown in Figs. 3 to 6 and to be described later in connection with these figures (and a similar switch will take place in each of the following sections where the spare line depends upon the preferred working line *wl1* for pilot), tying the spare line *sl* to the working line *wl2* (which becomes an emergency preferred line). With the pilot frequencies obtained from the working line *wl2* in the following sections (where the spare formerly obtained pilot from the working line *wl1*), the spare line would be maintained available for working line *wl2*. Working line *wl1* would remain faulty in the following sections of the carrier link but cannot take the spare line from the working line *wl2* in those sections.

*Case VII.—Coexistent failures on the working line wl1 and the spare line.—Spare line fails first*

When the spare line *sl* fails, all the receiver switches in the receiving equipment RS are released immediately and are blocked for the duration of the spare line failure. If the working line *wl1* later fails, its receiver switch cannot be operated. After a given interval this double failure will initiate an emergency switch at the transmitting end of the faulty section, tying the spare line to the working line *wl2* (which becomes the emergency preferred line), as will be described later in connection with the operation of the detailed circuits shown in Figs. 3 to 6. A similar emergency switch will occur at the transmitting end of each of those sections where the spare line obtains pilot from the working line *wl1*. In the following sections of the link, the working line *wl1* will remain faulty but transmission will not be switched to the spare line. Only transmission from the working line *wl2* can be switched to the spare line.

*Automatic restoration*

When a failed working line becomes or is made good as indicated by normal pilot power on that line (associated pilot indicator not operated), and this power is maintained for about a minute, the switching section will be automatically restored to the normal condition indicated by the condition of the switches S1 to S5 in Fig. 2. The delay is inserted in the operation to avoid repeated switches due to an intermittent trouble on the failed line.

Figure 3:
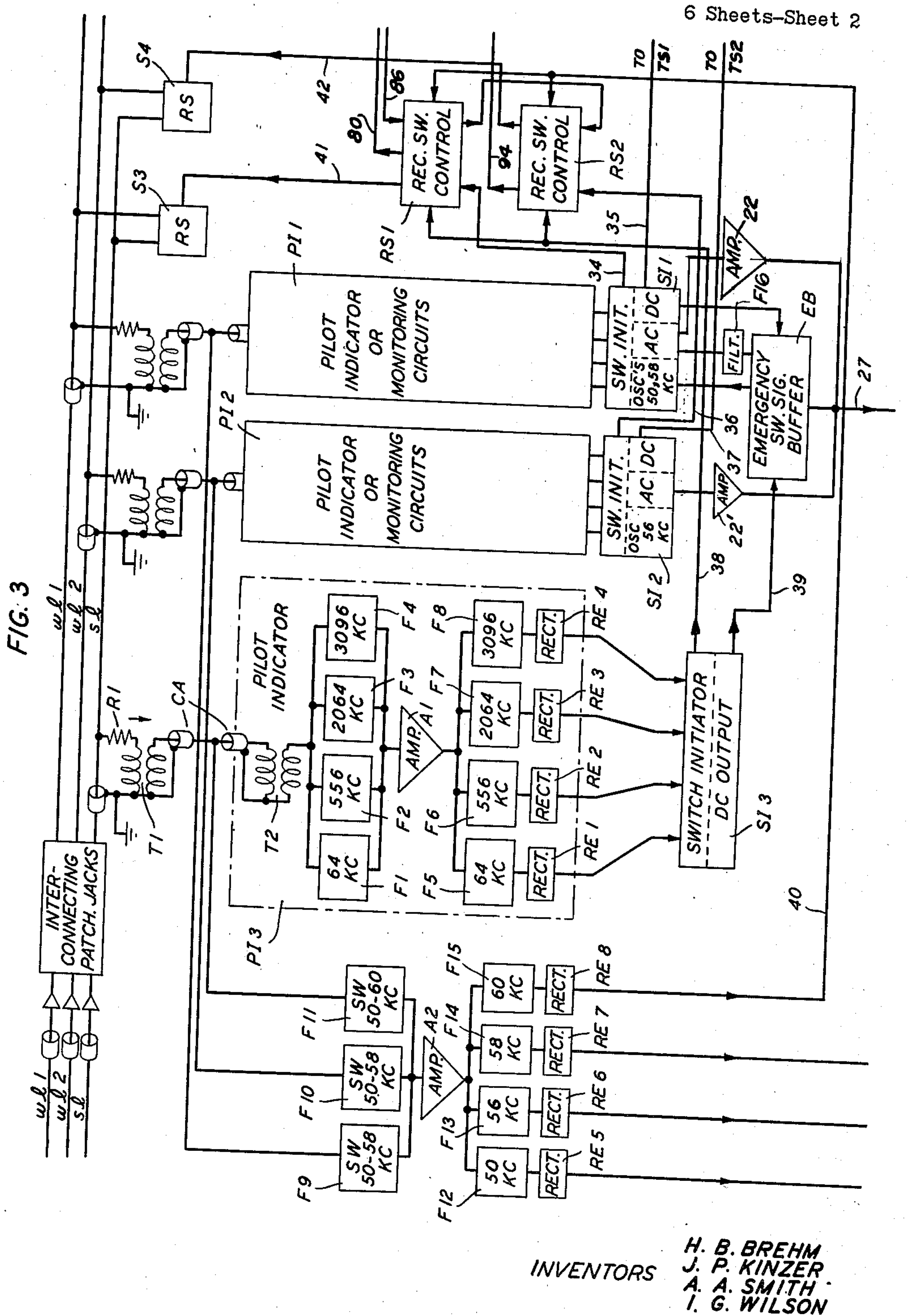
Figure 4:
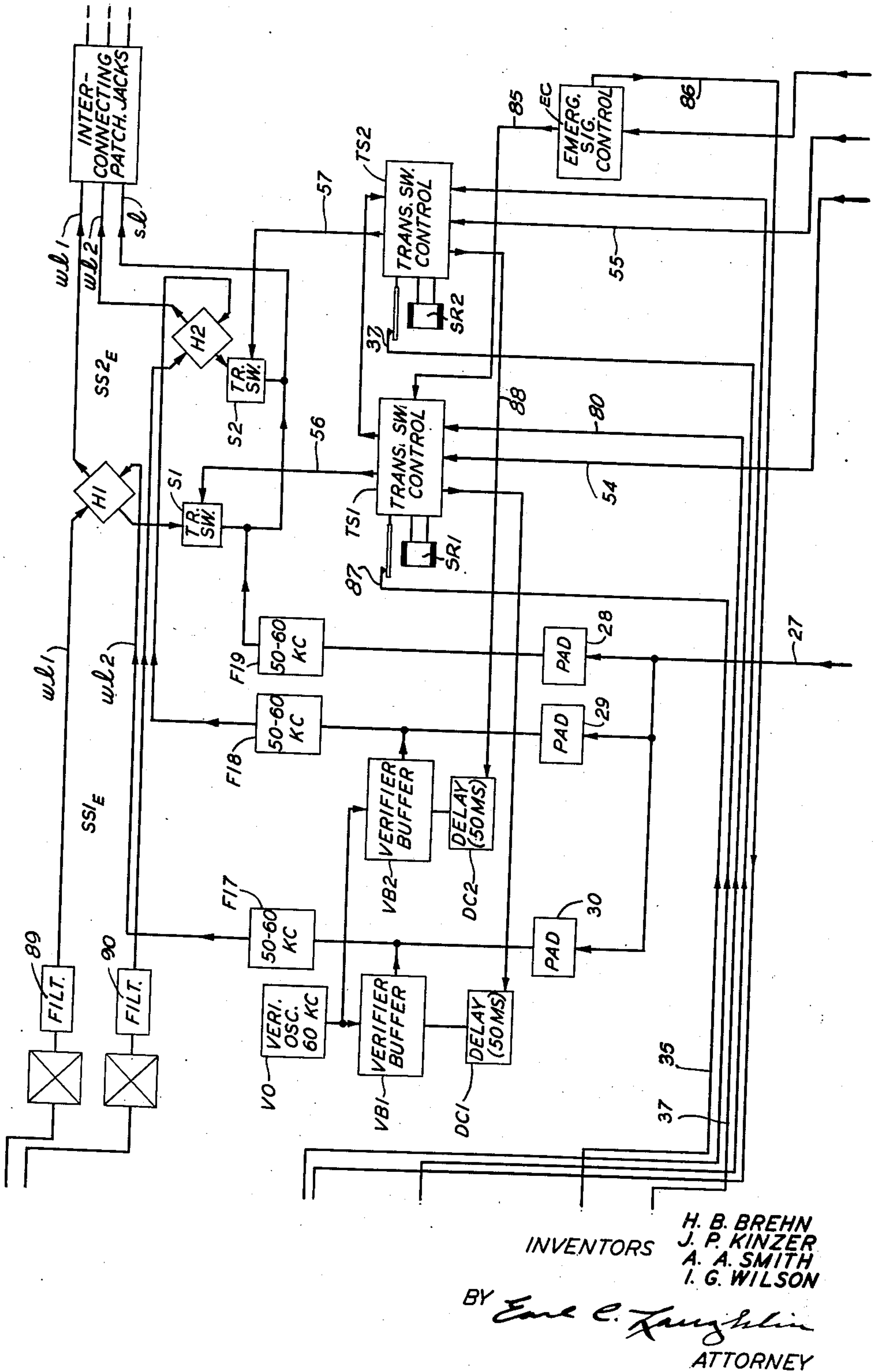

Figs. 3 to 6, in combination, with Fig. 3 to the left and Fig. 4 to the right of Fig. 3, Fig. 5 directly below Fig. 4 and Fig. 6 to the left of Fig. 5 and directly below Fig. 3, show a schematic circuit arrangement of the line testing and switching arrangements in accordance with the invention for each direction of transmission, which would be located at each of the main switching repeater stations MR1, MR2 and MR3 in the two-way carrier system of Fig. 1. The circuit arrangement as shown in Figs. 3 to 6 is essentially a functional line diagram in which each of the single lines shown represents a two-wire transmission path and the apparatus elements connected by these paths are illustrated as boxes with suitable labels for indicating their functions. Also, in these figures, an arrow pointing towards a box representing a control device from another box indicates that the control device will be operated to perform its function under control of the apparatus represented by the other box. In Figs. 3 to 6, where the control devices represented by the boxes are such as to require a detailed showing of the circuits required therein to perform its functions, one form of circuit adapted for producing such functions is illustrated in detail in one of the other figures, Figs. 7 to 9.

The testing and switching circuits of the invention as shown in Figs. 3 to 6 are essentially electronic in operation, although, for the purposes of simplification, some of the transmitting and receiving switching equipment in these figures and in Figs. 8 and 9 as shown employ electromagnetic switching relays. Obviously, these switching operations could be performed by the use of other switching arrangements, such as vacuum tubes, "trigger" gas tube circuits or any of the "gating" circuits well known in the art, which employ no movable elements in place of such relays, and thus increase the speed of switching.

The lines and associated apparatus at the main switching repeater station of Figs. 3 to 6 corresponding to the similar apparatus shown in Figs. 1 and 2 bear similar reference characters. All main switching repeater stations are identical but for the purpose of simplifying the description, it will be assumed that the station illustrated in Figs. 3 to 6 is the main switching repeater station MR1 of the carrier system of Fig. 1 which connects switching sections $SS1_W$ and $SS2_W$, and switching sections $SS3_E$ and $SS4_E$. Thus, the lines designated *wl1*, *wl2* and *sl* transmitting in the direction from west to east, to the left of the hybrid coil bridge circuits H1 and H2 (Figs. 4 and 6) are the two working lines and the spare line, respectively, of the repeater switching section $SS1_E$ terminating at the station MR1 in Fig. 1, and the lines designated *wl1*, *wl2* and *sl* to the right of the hybrid coil bridge circuits H1 and H2 are the two working lines and the spare line, respectively, of the following repeater section $SS2_E$ of Fig. 1, transmitting out of the station MR1. Similarly, the lines *wl1*, *wl2* and *sl* transmitting in the direction from east to west, to the right of the hybrid coil bridge circuits H1' and H2' (Fig. 6) are the two working lines and the spare line, respectively, of the switching section $SS3_W$ terminating at the station MR1 in Fig. 1, and the lines *wl1*, *wl2* and *sl* transmitting in the direction from east to west, to the left of the hybrid coil bridge circuits H1' and H2' in Fig. 6 are the two working lines and the spare line, respectively, of the following repeater section $SS4_W$ transmitting out of the station MR1 in the east-to-west direction.

The input of the working line *wl1* of the switching section $SS2_E$ is normally connected in wave transmission relation with the output of the working line *wl1* in the switching section $SS1_E$, and the input of the working line *wl2* of section $SS2_E$ is normally connected in wave transmission relation with the output of the working line *wl2* of the switching section $SS1_E$, through the hybrid coil bridge circuits H1 and H2, respectively. The input of the spare line *sl* of the switching section $SS2_E$ is adapted for connection alternatively to the output of the line *wl1* in the preceding switching section $SS1_E$ or the output of the line *wl2* in the preceding switching section $SS1_E$ depending on the operating condition of the transmit switches S1 and S2, respectively, which are under control of the transmitting switching control circuits TS1 and TS2, respectively, to be described later. The switches S1 and S2 are essentially double-pole, double-throw and may be make-before-break mercury or reed switches such as are well known in the art or of any other suitable type. In the case where the line *wl1* in the section $SS1_E$ is the preferred line, that is, the one having first priority as regards switching to the spare line, the switch S1 is normally closed and the switch S2 normally open, so that the input of the spare line *sl* in the section $SS2_E$ is normally connected in transmission relation with the output of the working line *wl1* in section $SS1_E$ through switch S1 and hybrid coil bridge circuit H1, and is normally effectively disconnected from the hybrid coil bridge circuit H2 and thus from the output of the working line *wl2* in the section $SS1_E$. The connections of the working lines in the repeater sections $SS3_W$ and $SS4_W$ for the east-to-west direction of transmission to the right and left of the hybrid coil bridge circuits H1' and H2' are similar to those described above for the repeater sections $SS1_E$ and $SS2_E$ for the west-to-east direction of transmission just described.

The receiving control equipments represented by the boxes 1 and 3 at the station MR1 in Fig. 1 associated with the lines transmitting in the west-to-east and east-to-west directions of transmission, respectively, as shown in Fig. 3 include identical pilot indicator or monitoring circuits PI1, PI2 and PI3 having their inputs respectively bridged across the outputs of the working line *wl1*, the working line *wl2* and the spare line *sl* in the switching sections $SS1_E$ and $SS3_W$, respectively, through identical coupling circuits including the 1,000:75-ohm transformer T1 with a 1,000-ohm series resistor R1 on its high impedance side to reduce impedance irregularities and cross-talk, and a 75-ohm flexible cable CA connecting the low side of transformer T1 to the input of the pilot indicator proper PI1, PI2 or PI3.

At this point the paths of the pilot waves of the frequencies 64, 556, 2,064 and 3,096 kc., and any switching tones in the frequency range (say 50 to 60 kc.) which may be received over the lines *wl1*, *wl2* and *sl* from the input of the switching section SS1E or SS3W in response to pilot energy of abnormal level at the output of any of the lines transmitting in the opposite direction in the corresponding switching section SS4W or SS1E for that direction in the manner described in connection with Fig. 2, are separated.

Each of the identical pilot indicators PI1, PI2 or PI3, as shown for one pilot indicator in detail in the box designated PI3, includes an input transformer T2 fed from the output of the cable C1; four narrow band filters F1 to F4 connected in parallel with each other, fed in parallel from the output of transformer T2, and adapted respectively to select from the applied waves the pilot waves of the frequencies 64, 556, 2,064 and 3,096 kc., respectively, and to supply approximately 40 decibels discrimination between the pilots and the speech channels. The crystal filters utilized for this purpose in the commercial system constructed had pass bands of 2 kc. for the two higher frequencies and for the 64 kc. pilot frequency and a pass band of 1 kc. for the 556 kc. frequency, where the test tone products may create unacceptable spillover on the wider band. The outputs of the filters F1 to F4 are paralleled and fed to the input of a common amplifier A1. The amplified pilots in the output of amplifier A1 are fed in parallel through the relatively broad-band filter circuits F5, F6, F7 and F8 respectively tuned to the 64, 556, 2,064 and 3,096 kc. pilot frequencies. The two sets of parallel filters F1 to F4 and F5 to F8 in each pilot indicator PI1, PI2 and PI3 are required to provide adequate discrimination between the individual pilot frequencies, and between the pilot frequencies and the speech channels. The outputs of the respective filters F5, F6, F7 and F8 are fed to the separate rectifiers RE1, RE2, RE3 and RE4, respectively, utilized to provide full-wave rectification of each pilot frequency. Each of the rectifiers RE1 to RE4 may, for example, use germanium crystals in a conventional circuit. The rectified output of the rectifiers RE1 to RE4 are fed from the output of each pilot indicator PI1, PI2 and PI3 to separate switch initiators represented by the boxes SI1, SI2 and SI3, respectively. The switch initiators SI1 and SI3 in combination, for each direction of transmission, comprise control circuits, such as are represented by the box CC in the simplified schematic of Fig. 2.

The function of each of the switch initiators SI1 and SI2 associated with the output of the pilot indicator PI1 and PI2, respectively, for the working lines *wl1* and *wl2*, respectively, of the repeater section SS1E for the west-to-east direction of transmission, and (Fig. 4) with the corresponding working lines of the repeater section SS4W for the east-to-west direction of transmission, is to provide a source of switching tone for identifying the associated working line; for releasing that tone for transmission over the lines transmitting in the opposite direction in the repeater section SS4W or SS1E, respectively, in response to an abnormal change (say, ±5 db) in the pilot power output of the associated pilot indicator resulting from a faulty condition of that line; and to provide D.-C. voltages for use in controlling the receiving switching equipment of the same repeater section and the transmitting switching equipment of the following repeater section in the manner to be described later.

The function of the switch initiator circuit SI3 associated with the output of the pilot indicator PI3 for the spare line *sl* of the repeater section SS1E for the west-to-east direction of transmission or of the repeater section SS3W for the east-to-west direction of transmission is merely to provide a D.-C. voltage under control of an abnormal change in the pilot output power of the associated pilot indicator PI3 resulting from a serious fault in that spare line, for use in controlling the receiving switching equipment of that repeater section, blocking the operation of the switching initiators associated with the working lines of the same repeater section, and for controlling an emergency switch at the transmitting end of the faulty working line under certain conditions in a manner to be described later.

The details of one form of circuit which may be used for the switch initiators SI1 and SI2 for the abovementioned purposes is illustrated in Fig. 7 associated with the output of a pilot indicator such as previously described. The switch initiator SI1 or SI2, as shown in Fig. 7, has four like input circuits 13, 14, 15 and 16 respectively connected across the outputs of the rectifiers RE1, RE2, RE3 and RE4 in the associated pilot indicator PI1 or PI2. Two capacitors C1 and C2 are connected in series across each of these input circuits, and each pair of capacitors is connected through a separate pair of series diode rectifiers 17 and 18, poled as shown, across the common circuit 19 which is terminated at one end by the resistors 20 and 21 connected in series, a mid-point between this pair of resistors being connected to ground. One or more oscillators STO have their outputs applied at a mid-point between each pair or capacitors C1 and C2 in the input circuits 13, 14, 15 and 16, respectively. Each switching oscillator STO, which may be of a vacuum tube or any other suitable type, is adapted for generating a switching tone of a different frequency within a frequency band (say, 50 to 60 kc.) which is below the signal frequency range. The switching tones generated by certain of these oscillators of frequencies, say of 58 and 56 kc., are used for identifying the particular working line *wl1* or *wl2*, respectively, with which the switching indicator and its controlling pilot indicator are associated. Another of these oscillators associated with the switch indicator connected to the preferred working line, only, say line *wl1*, generates a different frequency tone, say 50 kc. which is utilized for controlling an emergency switch under certain conditions to be described later. The input of an amplifier 22 or 22′ is connected across the common circuit 19 through the parallel-connected capacitors 23 and 24, for taking off an alternating tone output from that circuit.

Sources of D.-C. voltage (−24 and +135 volts) are connected as indicated through the series resistors 25 and 26, respectively, to the common circuit 19, and are so poled and of such values as to apply biasing potentials to each pair of diode rectifiers 17 and 18 in the switch initiator, operating as "gating" elements, to make their effective impedances such as normally to prevent transmission of the alternating current tone from the switching tone oscillators STO to the common circuit 19. When there is an abnormal change in the pilot output power of one of the rectifiers RE1 to RE4 in the associated pilot indicator PI1 or PI2 resulting from a serious fault in the working line *wl1* or *wl2* across which that pilot indicator is connected, the resulting voltage applied to the associated input circuit 13, 14, 15 or 16 of the switch initiator is sufficient to overcome the normal biasing potentials applied to the pair of gating diode rectifiers 17 and 18 supplied from that input circuit. This will allow the switching tone from the associated switching tone oscillator or oscillators STO to be applied to the common circuit 19, and this switching tone will be supplied through the capacitors 23 and 24 to the input of amplifier 22 or 22′, and to the filter F16 also where the switch initiator is SI1 associated with the preferred working line *wl1*.

Where the switch initiator operated is SI1 associated with the preferred working line *wl1*, alternating tones of both the frequency (say, 58 kc.) identifying that line and of another frequency (say, 50 kc.) obtained from a second oscillator STO connected to the input of the switch initiator SI1 will appear in the common circuit 19 of that initiator. Tone of the second frequency (50 kc.) will be selected by the filter F16 and supplied to the input of the emergency switching signal buffer EB. Also, a portion of the D.-C. voltage output appearing in the common circuit 19 of SI1 will be applied to the emergency signal buffer EB. The tone of the frequency (58 kc.) identifying the failed line *wl1* will be selected and amplified by the amplifier 22 which is tuned to that frequency. Where the switch initiator operated is SI2 associated with the non-preferred working line *wl2*, a switching tone of the frequency identifying that line (say, 56 kc.) only appears in the output circuit 19 of that initiator and will be selected by the amplifier 22′; corresponding to the amplifier 22 in the output of switch initiator SI1, which is tuned to select that frequency.

Different energy portions of the amplified tone (of the frequencies 58 kc. or 56 kc., respectively) appearing in the output of the amplifier 22 or 22′, are transmitted, as shown in Fig. 3 and Fig. 6, from the output of each switch initiator SI1 and SI2, respectively, over the common lead 27 and through parallel circuits respectively including a different one of the resistance loss pads 28 to 30 and a different one of the filters 31 to 33 each having a frequency pass range of 50 to 60 kc. and thus adapted to pass any one of the transmitted tones. The tone of 58 or 56 kc. in the outputs of the filters 31 and 32 pass through the hybrid coil bridges H1′ and H2′, respectively, to the inputs of each of the coaxial lines *wl1*, and *wl2*, respectively, in the corresponding switching section (SS4w) transmitting in the opposite direction, and the tone of 58 or 56 kc. in the output of filter 33 will be passed directly to the input of the spare line *sl* of section SS4w transmitting in the same direction. The switching tone of 58 or 56 kc. will be transmitted over the westwardly directed coaxial lines of switching section SS4w to the input of that section and thence to the transmitting switch control equipment (TC) for the corresponding eastwardly directed switching section SS1E, as previously described in connection with Fig. 2 and described in more detail in connection with Fig. 3 in another part of the application.

The padding and filtering in the switching tone paths is employed to provide isolation and separation of the various switching tones, and to maintain necessary crosstalk separation between coaxials. The pad losses are such that the tones are fed to the coaxials at the required amplitude. The filters 31 to 33 are designed to pass the frequencies in the 50 to 60 kc. range with about 50 decibels discrimination.

A D.-C. voltage is also produced in the common circuit 19 of the switch initiator SI1 or SI2 when that initiator is operated in response to an abnormal change in the pilot output power of the associated pilot indicator caused by a serious fault in the working line *wl1* or *wl2*. Portions of this voltage are taken off from the circuit 19 at any suitable point, as shown in Figs. 3 and 4, by the leads 34 and 35 in the case of switch initiator SI1, or leads 36 and 37 in the case of switch initiator SI2, and are transmitted over these leads to the receiving switching control circuit RS1 and to the transmitting switching control circuit TS1, and to the receiving switching control circuit RS2 and the transmitting control circuit TS2, respectively, to control these circuits in the manner to be described later.

The switch initiator SI3 associated with the output of the spare line *sl* of each repeater section (SS1E and SS3w) through the pilot indicator PI3 is identical with the switch initiators SI1 and SI2 associated with the working lines of these sections, the circuit of which is shown in Fig. 7, except that in the case of the switch initiator SI3, the switching tone oscillator STO and the switching tone output circuits employed in the switch initiators SI1 and SI2 are eliminated. A D.-C. voltage appearing in the common circuit 19 of the switch initiator SI3 when the rectified pilot applied to one of the inputs of that switch initiator from one of the rectifiers RE1 to RE4 in the associated pilot indicator PI3 is abnormal due to a serious fault in the associated spare line *sl*, is taken off from any suitable points in that circuit. This voltage is applied, as shown in Fig. 3, over the leads 38 and 39 to the receiving switching controls RS1 and RS2, and to the emergency switching signal buffer EB, for the purposes which will be described later in connection with these switching circuits.

The transmitting control equipment represented by the boxes 2, 4, 6, 8, 10 or 12 at each of the main switching repeater stations MR1, MR2 and MR3 in the system of Fig. 1, also includes verifier tone equipment for supplying a verifier signal at the transmitting end of each section under control of received switching tones, which is transmitted over the spare line of the section to the receiving end thereof to indicate at that end that a switching operation has been carried out at the transmitting end of a faulty section.

This verifier tone equipment, as shown in Figs. 4 and 6, respectively, includes a source VO, such as a continuously running oscillator, of any suitable type adapted for generating a tone of the frequency, say 60 kc., below the signal frequency range, used as the verifier tone. The output of the verifier tone source VO is connected in parallel to the input of the verifier buffers VB1 and VB2 which may be amplifiers normally blocked so as to prevent transmission therethrough of the verifier tone (60 kc.) from the output of VO. In this equipment for the west-to-east direction of transmission (see Fig. 4), the output of the verifier buffer VB1 is connected through a filter F17 having a pass range of 50–60 kc., hybrid coil H1 and transmitting switch S1 to the input of the spare line *sl* for the following repeater section, and the output of verifier buffer VB2 is connected through the filter F18 having a pass range of 50–60 kc., hybrid coil H2 and transmitting switch S2 to the input of the same spare line. The transmitting switch control circuit TS1 when it is operated to close or maintain closed the transmitting switch S1, is also operative through the delay circuit DC1 with a delay of about 50 milliseconds to unblock the verifier buffer VB1 so as to allow transmission of the 60-cycle tone from oscillator VO through the filter F17, hybrid coil H1 and switch S1 to the spare line. Similarly, when the transmitting control circuit TS2 is operative to close the transmitting switch S2, it is also operative through the delay circuit DC2 with a delay of 50 milliseconds to unblock the verifier buffer VB2 so as to allow transmission of the 60 kc. verifier tone from oscillator VO therethrough and then through the filter F18, hybrid coil H2 and transmitting switch S2 to the input of the same spare line. For example, if the verifier buffer VB1 or VB2 is a vacuum tube amplifier, the unblocking of this amplifier may be attained by removing or reducing a normal blocking negative bias on the grid of an amplifier tube. Similar verifier tone supply equipment is associated with the east-to-west direction of transmission as shown in Fig. 6.

The switching tone receiving circuit in the control receiving equipment at each of the main switching repeater stations in the system of Fig. 1, for the west-to-east direction of transmission includes, as shown in Fig. 3, three filters F9, F10 and F11, having their inputs respectively connected to the outputs of the working line *wl1*, the working line *wl2* and the spare line *sl* of the preceding switching section through the flexible cable C1 and the input transformer T1 and its associated series resistor R1 also providing the input for the pilot indicator PI1, PI2 and PI3, respectively, at that station. The filters F9, F10 and F11 used in the switching tone receiving circuit have two different band widths. The filters F9 and F10 associated with the working lines *wl1* and *wl2* pass the 50–58 kc. line identifying tones and attenuate the 60-kc. verifier tone. The filter F11 associated with the spare line *sl* passes the frequency band of 50-to-60 kc. This assures the reception of verifier tone from the spare line only. The filters F9 to F11 are employed to separate the switching tones from the pilots and the speech channels. The switching tones in the output of the filters F9, F10 and F11 are amplified in a common amplifier A2 and are then separated by the four narrow band filters F12, F13, F14 and F15 which pass the switching tones of the frequencies 50, 56, 58 and 60 kc., respectively. The 50, 56, 58 and 60 kc. tones are respectively rectified in the rectifiers RE5, RE6, RE7 and RE8 and are then passed to their respective transmitting switch controls (Fig. 6). The 50-kc. tone passes to the emergency switching control circuit EC and the output of that control is utilized to control the operation of the transmitting switching controls TS1 and TS2 respectively controlling the transmitting switches associated with the coaxial lines of the corresponding switching section for the east-to-west direction, corresponding to the transmitting switches S1 and S2 associated with the coaxial lines transmitting in the west-to-east direction at the same main switching repeater station. Similar switching tone receiver equipments shown in Fig. 5 controlled from the lines transmitting in the east-to-west direction, as shown by the use of the same reference characters for identifying the corresponding apparatus, are utilized to control the transmitting switching control equipment and an emergency control circuit EC (Fig. 4) associated with the coaxial lines transmitting in the west-to-east direction.

The receiving switching equipment included within the control equipment represented by the boxes 1, 5 and 9 for the west-to-east direction of transmission at the main switching repeater stations MR1, MR2 and MR3 in the system of Fig. 1, comprises, as shown in Fig. 3, the two receiving switch controls RS1 and RS2, previously referred to, the operations of which are partly controlled over the leads 34, 36 and 38, respectively, from the D.-C. output circuits of the switch initiators SI1, SI2 and SI3 and verifier tone receiving equipment, respectively, and two receiving switches S3 and S4 respectively controlled over the leads 41 and 42 from the receiving switch control circuit RS1 and the receiving switch control circuit RS2, respectively. Similar receiving switching equipment, as indicated by the use of the same reference characters for identifying the corresponding apparatus, included within the boxes 3, 7 and 11 in the system of Fig. 1 for the east-to-west direction of transmission, is shown in Fig. 5. One form which this receiving switch equipment may have is shown in Fig. 9.

In Fig. 9, the receiving switch control circuit RS1 and the receiving switch control circuit RS2 are represented by boxes so labeled, each of which may comprise an amplifier-rectifier such as is well known in the art, respectively supplied with D.-C. control energy from operated switch initiator SI1 over lead 34, from operated switch initiator SI3 over lead 38, from switch initiator SI2 over lead 36, from switch initiator SI3 over lead 38 and from the verifier tone receiving equipment over lead 40, as indicated. The D.-C. energies received from the operated switch initiator SI1 and the verifier tone receiving equipment (rectifier RE8) in combination cause the operation of the receiving switch control RS1 and thus of receiving switch S3. Similarly, the D.-C. energies received from operated switch initiator SI2 and verifier tone receiving equipment (RE8) in combination cause the operation of RS2 and thus of S4. The D.-C. energy received from the operated switch initiator SI3 will prevent operation of the receiving switch control circuits RS1 and RS2 and thus of the switches S3 and S4, or if they are already operated, will return them to the released condition. The receiving switch S3 comprises an electromagnetic switching relay, designated by the same reference character, having its operating winding connected across the output of the amplifier-rectifier RS1, and the receiving switch S4 by an electromagnetic relay designated by the same reference character having its operating winding connected across the output of the amplifier-rectifier RS2. In the unoperated condition of the receiving switch control (amplifier-rectifier) RS1, with no operating voltage supplied to its input from the associated switch initiator SI1, and the verifier tone receiving equipment in combination, the relay S3 is unoperated and its switching contacts are in the conditions indicated in Fig. 9 so that the output of the working line *wl1* in the preceding switching section is connected to the working line *wl1* in the following switching section through the normally closed contacts 43; and with the terminating resistance 44 in the working line $wl1$ of the preceding switching section short circuited through the normally closed switching contacts 45 of the relay S3. Similarly, in the unoperated condition of the receiving switching control (amplifier-rectifier) RS2 with no operating voltage being applied to its input from the switch initiator SI2 and verifier tone receiving equipment in combination, the relay S4 connected to the output of RS2 is unoperated with its switching contacts in the positions indicated in Fig. 9 so that the output of the working line $wl2$ in the preceding switching section is connected to the input of the working line $wl2$ in the following switching section through the normally closed switching contacts 46 of relay S4; and the terminating resistance 47 in the output of working line $wl2$ in the preceding switching section short circuited through the normally closed switching contacts 48 of the relay S4.

The output of the spare line $sl$ of the preceding switching section is normally terminated by a suitable network, 49, which may be a resistor as shown, through the normally closed contacts 60 and 61 of the relay S3 and by the resistor 62 through the normally closed contacts 63 and 64 of relay S4.

When a D.-C. voltage is produced in the switch initiator SI1 by an abnormal change in the pilot output power of the associated pilot indicator PI1 in response to a serious fault in the normal working line $wl1$ of the preceding switching section, this voltage will be applied to the input of amplifier-rectifier RS1. The resulting current in the output of the amplifier-rectifier RS1 will not be sufficient in itself to cause operation of the relay S3 in its output. The operation of that relay will be delayed for the time interval required for the switching tone of the frequency 56 kc. to pass from the initiator SI1 to the input of the preceding switch section and the verifier tone of 60 kc. to return over the spare line $sl$, to be selected at the output of that line and rectified, and the resulting rectified verifier voltage to be applied over lead 40 to the input of RS1 to supplement the voltage applied thereto from SI1. The relay S3 will then operate in response to the increased current in the output of RS1 to break its normally closed contacts and close its normally open contacts. The opening of contacts 43 and 44 will cause the connection of the output of line $wl1$ in the preceding switching section to the input of the line $wl1$ in the succeeding switching section to be broken, and the short circuiting connection around the terminating resistor 44 in the line $wl1$ of the preceding switching section to be opened thereby suitably terminating that line. The opening of the normally closed switching contacts 60 and 61 or relay S3 will break the connection of the output of the spare line $sl$ of the preceding switching section to the terminating resistor 49 and the simultaneous closing of the contacts 65 and 66 of the operated relay S3 will connect the output of the spare line $sl$ of the preceding switching section to the working line $wl1$ of the following switching section $wl1$.

Similarly, the D.-C. output voltage produced in the switch initiator SI2 by abnormal change in the pilot output power of the associated pilot indicator PI2 in response to a serious fault in the working line $wl2$ of the preceding switching section will be applied to the input of the amplifier-rectifier RS2. The resulting current in the output of that amplifier-rectifier will not be sufficient to cause operation of the relay S4. The increased current in the output of the receiving amplifier-detector RS2 when the input thereto is supplemented by the rectified 60-cycle verifier tone energy on lead 40 received over the lines transmitting in the opposite direction from the input of the switching section when the transmitting switches thereat are operated, will result in the operation of relay S4 to open its normally closed contacts and close its normally open contacts. In a manner similar to that described above for operation of relay S3, the opening of its normally closed contacts of relay S4 will result in the disconnection of the output of the line $wl2$ in the preceding switching section from the working line $wl2$ in the following switching section and the insertion of the resistance termination 47 in the output of the line $wl2$ of the preceding switching section; and the disconnection of the terminating resistance network 62 from the output of the spare line $sl$ in the preceding switching section. The simultaneous closing of the normally open switching contacts 67 and 68 of the operated relay S4 will cause the connection of the output of the spare line $sl$ of the preceding switching section to the working line $wl2$ of the following switching section.

The transmitting switching equipment included within the control equipment represented by the boxes 2, 6 and 10 for the west-to-east direction of transmission and the boxes 4, 8 and 12 for the east-to-west direction of transmission, respectively, at the main switching repeater stations MR1, MR2 and MR3 in the system of Fig. 1, comprises, as shown in Fig. 4, two transmitting switch control circuits TS1 and TS2, the operations of which are respectively controlled over the leads 54 and 55, respectively, by switching tones received over the coaxial lines in the corresponding switching repeater section for the opposite (east-to-west) direction from the preceding main switching repeater station when the switch initiators SI1 or SI2, respectively, thereat associated with those lines are operated at that station; and the transmitting switches S1 and S2 respectively controlled over the leads 56 and 57 from the outputs of the transmitting switching control circuits TS1 and TS2, respectively. One form which this transmitting switching equipment may have is shown in Fig. 8.

In Fig. 8 the transmitting switch controls TS1 and TS2 are represented by boxes correspondingly labeled, each of which may comprise an amplifier-rectifier such as is well known in the art. The transmitting switch S1 comprises an electromagnetic switching relay designated by the same reference character, having its operating winding connected across the output of the amplifier-rectifier TS1; and the transmitting switch S2 by an electromagnetic relay designated by the same reference character, having its operating winding connected across the output of the amplifier-rectifier TS2. In the unoperated condition of the transmitting switch control (amplifier-rectifier) circuits TS1 and TS2 with no switching tone applied to their inputs, the relays S1 and S2 are unoperated and their switching contacts are in the conditions indicated in Fig. 8. In that condition the input of the spare line $sl$ in the following switching section is connected to the working line $wl1$ of the preceding switching section through the normally made contacts 70 and 71 of relay S1 and hybrid coil H1. The input of the spare line *sl* of the following switching section is normally disconnected from the output of the working line *wl2* in the preceding switching section due to the normally open condition of the contacts 72 and 73 of relay S2.

In the case of a serious fault on the working line *wl1* in a switching section for the west-to-east direction of transmission following the main switching repeater station illustrated in Figs. 3 to 6, the operation of the switch initiator SI1 at the main switching repeater station at the output end of that section, will cause switching tones of the frequencies 58 and 50 kc. to be transmitted out over the coaxial lines transmitting in the opposite direction to the input of that section in the manner previously described. At the input of this section the rectified tone of 58 kc. will be applied over the lead 54 to the input of the transmitting switching control (amplifier-rectifier) TS1. The rectified tone of the frequency 50 kc. will be applied to the input of the emergency control circuit EC (Fig. 4) which is normally blocked and will serve to unblock that control to allow transmission therethrough of that rectified tone. A portion of the rectified 50 kc. tone in the output of EC will be applied over the lead 85 to the input of the transmitting control (amplifier-rectifier) TS1 in such manner as to apply a blocking bias to that control which is sufficient to prevent its operation by the rectified 58 kc. tone applied thereto over the lead 54. Therefore, the switching relay S1 connected to the output of TS1 will be unoperated and its switching contacts will be in the normal condition shown in Fig. 8 in which the input of the spare line *sl* is connected through made contacts 70 and 71 and hybrid coil H1 to the output of the line *wl1* in the preceding switching section. This spare line *sl*, therefore, is in condition to receive pilot from the latter working line.

Another portion of the rectified 50-kc. tone in the output of emergency control EC is applied over the lead 86 to the receiving switching control RS1 (Fig. 3) and serves to block that control.

Although complete operation of the transmitting switching control TS1 in response to the gating bias applied over the lead 54 is prevented by the blocking bias applied over the lead 85, the control TS1 so controlled is conditioned to apply a D.-C. voltage over the lead 81 (see Fig. 4) through the delay circuit DC1, the normally blocked verifier buffer VB1 associated with the output of the verifier oscillator VO for the west-to-east direction of transmission which, in the manner previously described, renders that buffer operative to transmit the verifier tone of 60 cycles to the input of the spare line *sl* for the following switching section in the manner described. This verifier tone at the output of the switching section will cause the switching of the output ends of the spare line *sl* and the line *wl1* in the manner which has been previously described.

The auxiliary relay SR1 connected to the output of the transmitting switching control TS1 is also rendered operative in response to the simultaneous application of the gating pulse over lead 54 and the blocking pulse over lead 85, to open its normally closed contacts 87 so as to break the connection of the switching initiator SI1 to the transmitting switching control TS1 over the lead 35.

The operation of the transmitting switch control TS2 and its associated switching relays S2 and SR2 will be described later in connection with a typical switching operation.

The purpose of the emergency switching signal buffers EB (Figs. 3 and 5) associated with the switching initiators SI1 and SI3 in the repeater section for each direction of transmission is to enable transmission of a 50-kc. switching tone to the lines transmitting in the opposite direction in response to co-existent failures of the spare and preferred working line *wl1*. The emergency switching signal buffer EB, which may be a normally blocked amplifier or a gating circuit similar to that employed in the switching initiator circuit SI1 as shown in Fig. 7, is supplied with a 50-kc. tone from the output of the switch initiator SI1 through the filter F16 when that initiator is operated in response to a faulty condition of the associated working line *wl1* in a repeater section. The buffer EB is unblocked only when a D.-C. output from the switch initiator SI1 is applied thereto over the lead 88, and simultaneously therewith a D.-C. voltage is applied thereto over the lead 39 from the output of the switch initiator SI3, due to simultaneous operation of both initiators in response to co-existent failures of the preferred working line *wl1* and the spare line *sl* for that switching section. The buffer EB includes means for delaying its being rendered operative for a period of 15 milliseconds after the double failure occurs. When the buffer EB is operated it allows transmission of the applied 50-kc. tone therethrough to the lead 27 over which it will be transmitted to the coaxial lines in the corresponding repeater section for the opposite direction of transmission, over which it will be transmitted to cause an emergency switch at the transmitting end of the faulty section, which will tie the spare line of that section to the working line *wl2* thereof (which becomes the emergency preferred line).

The blocking filters 89 and 90 each having a pass range of 50–60 kc. are inserted in the working lines *wl1* and *wl2* for the west-to-east direction of transmission between the points of connection of the receiving switches S3 and S4 thereto and the input of the hybrid coils H1 and H2, respectively. Similar filters having the same reference characters are connected in the working lines *wl1* and *wl2* in the corresponding repeater section for the opposite direction of transmission between the points of connection and the receiving switches S3 and S4 thereto, and the inputs of the hybrid coils H1′ and H2′, respectively. The purpose of these line filters is to confine the switching tones to the faulty line in each case while allowing transmission of the carrier communication and pilot signals.

The other interlocking controls (not numbered) between the apparatus units in the testing and switching circuits in accordance with the invention illustrated in Figs. 3 to 6 are provided for performing the functions referred to above for different combinations of fault conditions in the lines of each repeater section described above under separate side headings.

*Typical switching operation*

The operation of the circuits illustrated in Figs. 3 to 6 at each main switching repeater switching stations in the carrier system of Fig. 1 can be more easily understood by a description of a typical switching operation.

A fault is assumed in the working line *wl2* associated with the switching section $SS2_E$ for the west-to-east direction of transmission in the system of Fig. 1. It is assumed that no other faults exist on the other lines in that section. A change in power exceeding ±5 db at one of the four pilot frequencies 64, 556, 2,064 and 3,096 kc. monitored at the receiving end of that line *wl2* initiates the release of a 56-kc. switching tone through the operation of the switch initiator SI2 associated with the pilot indicator PI2 connected to that line. This tone, identifying the faulty line, is transmitted through amplifier 22 and over the leads 27 through the pads 28, 29 and 30, the 50-60 kc. band-pass filters 31, 32 and 33 and hybrid coils H1′ and H2′ to all the coaxial lines in the corresponding repeater section SS3w transmitting in the east-to-west direction. The tone passes along these coaxials to the output of that switching section where it is picked off by the 50-60 kc. band-pass filters, F9, F10 and F11 bridged across these lines at their receiving ends. The received 56-kc. tone after amplification in amplifier A2 then passes through its individual 2-kc. band-width filter F13 and rectifier RE6 which directs it through lead 55 to the transmitting switch control TS2 associated with the transmitting switch S2 for the west-to-east direction of transmission. When switch relay S2 is operated in response to operation of TS2 by rectified switching tone of the frequency 56 kc. received from the coaxial lines transmitting in the east-to-west direction in the manner described, the normally closed switching contacts 91 and 92 are opened to disconnect the balancing resistance 93 from hybrid coil H2, and switching contacts 72 and 73 are closed to connect the input of the spare line *sl* to the working line *wl2* of the preceding switching section through these contacts and hybrid coil H2.

The transmitting switch control circuit TS2 when its operates to close the transmitting switch S2 as described above is also operative through delay circuit DC2 with a delay of about 50 milliseconds to unblock the verifier buffer VB2 so as to allow transmission therethrough of the verification tone of 60 kc. from oscillator VO through the filter F18 and through the closed switch S2 to the input of the spare line *sl* in the west-to-east direction over which it will travel to the receiving switch control circuit RS2 at the receiving end of that section. The verifier tone at this point supplies the necessary addition to gating voltage received from the operated switch initiator SI2 to close the receiver switch S4 and tie the output of the spare line *sl* to the working line *wl2* in the following repeater section, thus completely by-passing the fault.

The switching in sections following the fault is prevented by blocking the transmitter switch S4 in those sections concurrently with the release of switching tone in the preceding sections. The blocking persists long enough for the switching operation to take place, i. e., 5 to 10 milliseconds, after which, the fault in the faulty working line *wl2* having been closed, that line is again available for switching in these following sections.

The testing and switching equipment at the terminals of a system such as shown in Fig. 1 would be identical with that used at the main switching repeater station as illustrated in Figs. 3 to 6, except for the elimination of the receiving control equipment including the pilot indicators and switch initiators, in connection with the lines transmitting from west to east, and the elimination of the transmitting control equipment, including the verifier tone generating equipment and the transmitting switch equipment, in connection with the lines transmitting from east to west.

It was determined from calculation of the operating times of the apparatus units including relays, used in the line testing and switching circuits of the invention as described above and the transmission times of the associated transmission lines and circuits, that if fast relays (reed type) were used for performing the final switching operations and the length of a switching section was approximately 300 miles, the time required for completing the switching of the working and spare lines at both the transmitting and receiving ends of a repeater section in response to a failure occurring in one of the working lines in that section would be about 5 to 10 milliseconds. This compares to a time of about 200 to 250 milliseconds required for switching the lines at one end only of a repeater section in the best of the line testing and switching systems of the prior art briefly described above.

The values which have been given above for the frequencies of the pilot waves, switching and verifier tones are by way of example only, and it is to be understood that other suitable values for these frequencies and thus for the frequency pass and blocking ranges of the various filters may be employed in the circuits of the invention. For example, for the particular range of line frequencies for the signals used in the commercial carrier system referred to above, it might be desirable to employ a higher carrier frequency just below the signal frequency range, say, 308 kc., for the lowest transmitted pilot frequency, in which case a higher range of frequencies could be employed for the switching tones used, for example, 208 to 296 kc., with a corresponding change in the pass and blocking ranges of the various filters used. Also, although the testing and line switching circuits of the invention for simplifying the description have been described as applied to a carrier system employing only three coaxial lines in each repeater section one of which is used as a spare, they would apply equally well to a system employing one line as a spare for four to eight lines. Also, although in the system described the verifier tone used for controlling the switching of the lines at the receiving end of each repeater section is generated at the transmitting end of each switching section, it is apparent that a portion of the switching tone transmitted from the receiving to the transmitting end of a switching section in response to a failure of any one of the working lines therein, to control the switching of the lines at the transmitting end of the switching section could be transmitted back over the spare line to control the switching of the lines at the receiving end as well. Other changes in the testing and switching circuits illustrated and described which are within the spirit and scope of the invention will occur to persons skilled in the art.

What is claimed is:

1. A two-way communication signaling system comprising, for each direction of transmission, a plurality of repeater sections in tandem between terminals of the system, each of said repeater sections comprising a plurality of like transmission lines extending longitudinally over the section in substantially parallel relation with each other two or more of the lines in each repeater section being regular working lines each of which is normally connected at its ends to the output of a different working line in the preceding repeater station and to the input of a different working line in the following repeater section, respectively, so as to be in condition to transmit signals representing different messages or programs between said preceding and following repeater sections, and another of said lines in each repeater section being normally available as a reserve or spare line for each of the other lines in that section, means for transmitting pilot waves of frequencies outside the signal frequency range over each of the lines in each repeater section and other means automatically responsive to an abnormal change in the pilot wave power output of any one of the regular lines in a repeater section such as would be caused by a serious faulty condition of that line to cause the spare line in that section to be switched at its two ends into transmission relation with the working lines in the preceding and following repeater sections, respectively, to which the faulty line is normally connected and said faulty line to be switched out of transmission relation therewith for the duration of the fault, but only if the pilot wave output of that spare line is within normal limits.

2. The system of claim 1, in which said pilot-responsive means operates in response to the abnormal power output of a faulty line first to switch the faulty and spare lines at their inputs and then to switch them at their outputs.

3. The system of claim 1, in which the means automatically responsive to the abnormal power output of a faulty line in a repeater section, when a switch to a spare line is required, operates first to send switching intelligence indicating which working line is to be switched from the output to the input of that repeater section, said switching intelligence at the input end of the section being utilized thereat to control the required switching of the faulty and spare lines at their sending ends, and to cause the sending of other switching intelligence indicating that the required switch at the sending end has been made back to the output end of the repeater section to thereafter control the switches of the faulty and spare lines at their receiving ends.

4. The system of claim 1, in which one of the normal working lines in each repeater section is a preferred working line, the input of the spare line in that section being normally connected in wave transmission relation with the one of the working lines in the preceding repeater section, to which the preferred line of the first section is normally connected so as to normally receive pilot wave energy therefrom, and the output of that spare line being normally disconnected from the working lines in the following repeater section, so that a fault in the preferred working line, coexistent with a fault in one of the other working lines, whether it occurs prior to, at the same time or later than that in another working line of the section, will result in the spare line being switched so as to replace the preferred line in the through signal transmission path and the other faulty line to be disconnected from the spare line.

5. In a two-way broad-frequency band carrier transmission system including terminal stations and a plurality of signal transmission lines for each direction of transmission extending between said terminal stations, said system being divided into a corresponding number of tandem repeater sections for each direction of transmission, each including different portions of all of said lines, two or more of the line portions in each repeater section operating normally as working lines to provide through transmission thereover of carrier signals in different frequency ranges, respectively, representing different messages or programs, between corresponding working line portions of the preceding and following repeater section, and another line portion in each repeater section serving as a reserve or spare line, normally out of service, for each of the working lines of the same section, a switching station located at the junction between each two successive correspondingly located repeater sections for each direction of transmission, means to transmit a plurality of pilot waves of different frequencies outside the signal frequency range over all the line portions in each repeater section for both directions of transmission, separate indicator means at each switching station for respectively picking off and monitoring a portion of the pilot wave energy in the output of a different one of the lines in the preceding repeater section, essentially electronic means at each switching station, controlled by the indicator responsive to an abnormal change in the pilot power output of an associated working line in said preceding repeater section such as would be caused by a serious faulty condition in that line, but only if the pilot power output of the indicator associated with the spare line of that section is within normal limits, to cause a switching tone of a distinctive frequency identifying the faulty working line to be sent back over the transmission lines transmitting in the opposite direction in the correspondingly-located repeater section to said preceding switching station, switching means at said preceding switching station, responsive to the received switching tone to disconnect the input of the faulty line from the working line in the preceding repeater section, normally connected thereto, and simultaneously to connect the input of the spare line in that section thereto, if it is not already so connected means responsive to operation of that switching means to send out a verifier tone over the spare line to the first switching station, and switching means at the first switching station responsive to the received verifier tone to disconnect the output of the faulty line at that point from the working line in the following repeater section and simultaneously to connect the output of the spare line thereto.

6. The system of claim 5, in which filtering means are inserted in each line portion of each repeater section to prevent transmission thereover of wave frequencies corresponding to the switching tones identifying the other line portions while enabling transmission thereover of the communication signals and of the pilot frequencies used for monitoring these line portions.

7. The carrier system of claim 5, in which the input of one of the working lines in each repeater section has switching priority over the other working lines therein, the input of the spare line is normally connected to the output of the working line having switching priority over the other working lines of the preceding repeater section and is normally disconnected from the other working lines of said preceding repeater section, and the switching means at each of said switching stations being arranged so that when there are co-existent serious faults on several working lines including the working line of first switching priority in a repeater section, transmission over that repeater section will be switched from said working line of said first switching priority to said spare line whether or not the faulty condition in said working line of first priority is initiated before, simultaneously with or after the initiation of the faults in the other working lines of less priority.

8. The system of claim 5, in which means are provided at each switching station operatively responsive to an abnormal change in the pilot output power of the spare line in the preceding repeater section for either direction of transmission such as would be caused by a serious fault in that line to cause the receiving switching equipment controlled by the indicator means associated with each of the working lines in that repeater section to be released and blocked for the duration of the fault in that spare line so as to prevent switching of through transmission from any of the working lines to the spare line of that section during that interval.

9. The system of claim 5, in which normally-blocked sources of switching tone of the distinctive frequencies identifying each of the working lines of the preceding repeater section for each direction of transmission are located at each switching station, all of said distinctive frequencies being in a frequency band below the signal frequency range, the source of distinctive frequency tone identifying a working line being enabled to allow transmission of that tone to the input of that repeater section in response to an abnormal pilot output of the indicator associated with that line.

No references cited.